United States Patent

Andrews

[15] 3,642,086
[45] Feb. 15, 1972

[54] MAINTENANCE VEHICLE

[72] Inventor: James A. Andrews, Aubrey, Tex.

[73] Assignee: Spyder Manufacturing Company, Inc., Lake Dallas, Tex.

[22] Filed: May 2, 1969

[21] Appl. No.: 821,370

[52] U.S. Cl. .................... 180/66 R, 180/73 D, 180/79.2 R, 220/22, 280/5, 280/43.23, 280/87 A
[51] Int. Cl. .................................................... B60k 17/10
[58] Field of Search .................... 180/66, 67, 79.2, 53, 1 F, 180/73; 60/53, 19; 280/43.23, 43.17, 43, 5, 124 F, 87 A; 220/22, 5, DIG. 24, 5 A, DIG. 27

[56] References Cited

UNITED STATES PATENTS

| | | | |
|---|---|---|---|
| 2,279,008 | 4/1942 | Nathan | 60/53 |
| 2,404,765 | 7/1946 | Valentyne | 280/5 A UX |
| 2,530,720 | 11/1950 | Paulson | 180/66 X |
| 2,580,480 | 1/1952 | Strehlow et al. | 180/1.5 |
| 2,866,510 | 12/1958 | Flamm | 180/53 FE |
| 2,899,214 | 8/1959 | D'Antini | 280/87.3 |
| 2,916,296 | 12/1959 | Muller | 280/124 F |
| 3,032,134 | 5/1962 | Banker | 180/79.2 |
| 3,154,164 | 10/1964 | Shaw et al. | 180/66 X |
| 3,214,911 | 11/1965 | Kempson | 60/19 X |
| 3,236,324 | 2/1966 | Levratto | 180/46 |
| 3,250,340 | 5/1966 | Roberson | 180/66 |
| 3,261,421 | 7/1966 | Forster et al. | 60/53 |
| 3,357,512 | 12/1967 | Wilson | 180/73 D |
| 840,660 | 1/1907 | Riker | 280/87.3 UX |
| 2,750,204 | 6/1956 | Ohrmann | 280/43.23 X |
| 2,902,288 | 9/1959 | Dill | 280/43.23 |
| 3,240,506 | 3/1966 | McMullen | 280/43.23 |

FOREIGN PATENTS OR APPLICATIONS

| | | | |
|---|---|---|---|
| 13,319 | 9/1903 | Austria | 220/22 |
| 915,419 | 7/1954 | Germany | 180/79.2 |

*Primary Examiner*—Benjamin Hersh
*Assistant Examiner*—Milton L. Smith
*Attorney*—Richards, Harris & Hubbard

[57] ABSTRACT

A maintenance vehicle including a frame having a front high portion and a rear low portion. The high portion supports operating accessories and a hydraulic fluid storage tank. The low portion supports an engine and a cockpit including a plurality of controls. The frame is supported on four hydraulic cylinders which extend to four wheels. The engine drives three hydraulic pumps. The pumps force hydraulic fluid from the tank to a motor which drives the vehicle, to a steering mechanism, to the cylinders which raise and lower the vehicle and to the controls which in turn direct the fluid to the accessories.

14 Claims, 10 Drawing Figures

INVENTOR:
JAMES A. ANDREWS

Richards, Harris & Hubbard
ATTORNEY

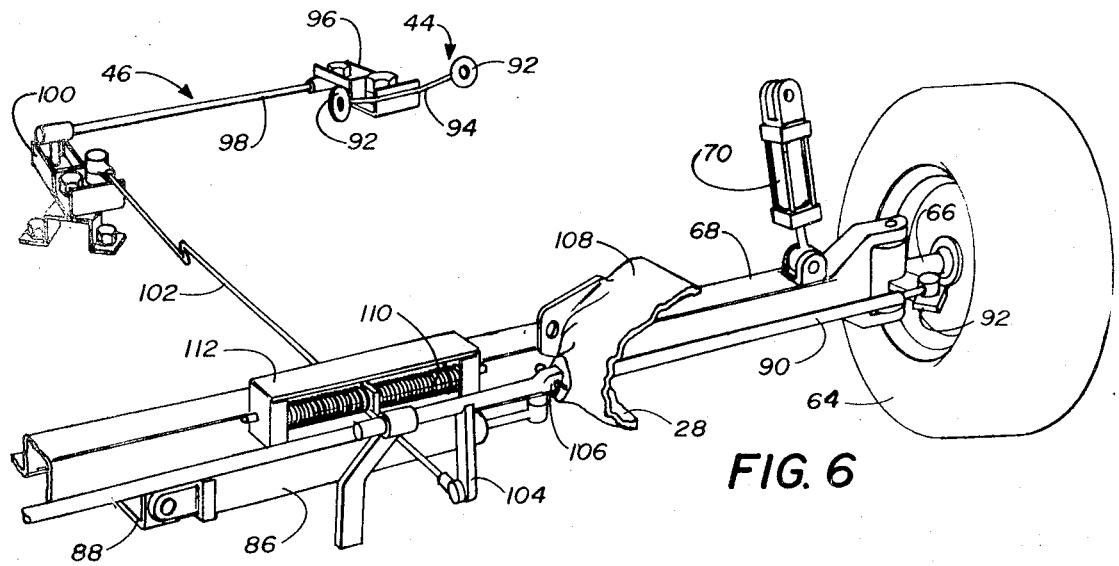
FIG. 6
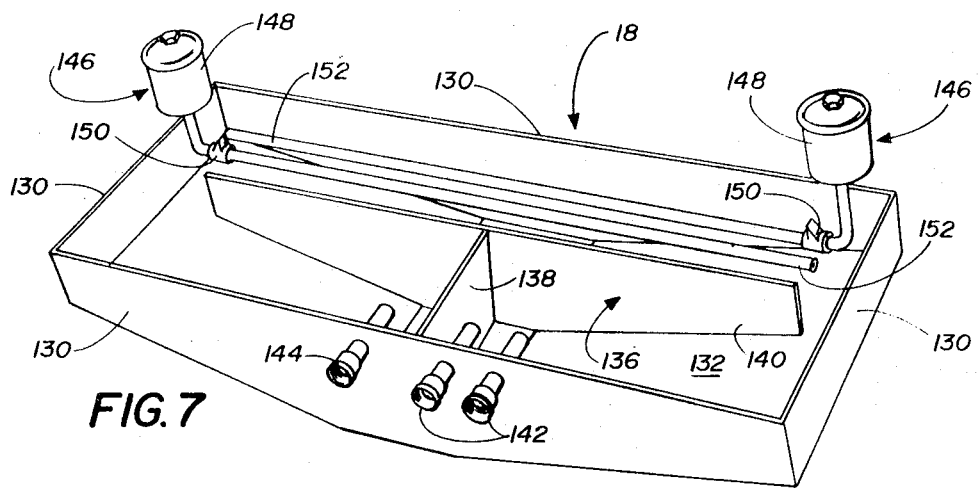
FIG. 7
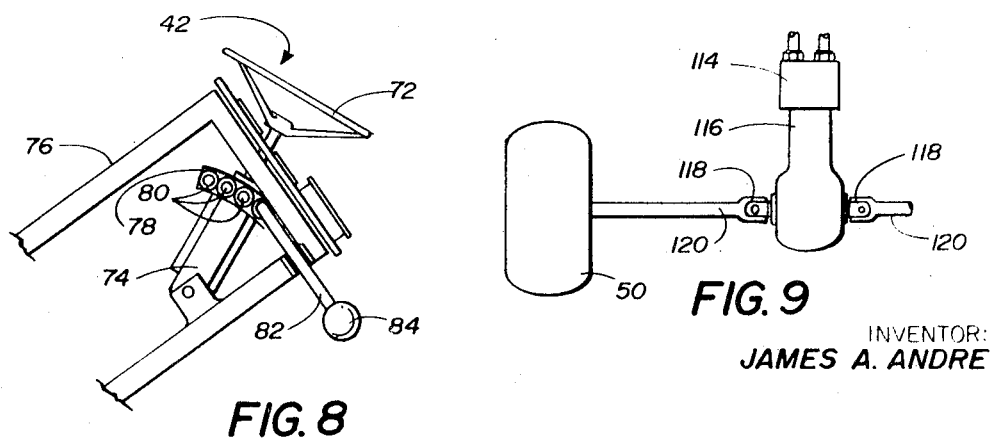
FIG. 8
FIG. 9
INVENTOR:
JAMES A. ANDREWS
Richards, Harris & Hubbard
ATTORNEY

MAINTENANCE VEHICLE

BACKGROUND OF THE INVENTION

Heretofore, industrial and municipal maintenance operations, such as grass cutting, snow removal, pavement sweeping and the like, have usually been performed by vehicles which may be conveniently grouped into classes. The first class includes vehicles especially designed and constructed to perform a single maintenance operation. Included in this class are the street sweepers commonly employed to clean city streets and similar special purpose machines. Maintenance vehicles of this class are excellent for their intended purpose but ordinarily cannot be used to perform any other maintenance operation.

The second class of maintenance vehicles includes conventional farm tractors equipped with maintenance operation performing accessories such as snow plows, rotary booms, etc. Often a variety of accessories are provided for each tractor. This allows each tractor to perform a variety of maintenance operations. However, as is frequently the case when a machine is used for something other than its intended purpose, farm tractors are inefficient when used to perform many maintenance operations. For example, farm tractors are usually designed to provide maximum pulling power. Many maintenance operations require very little pulling power. When a farm tractor is used for such an operation, the pulling power of the tractor is wasted. Furthermore, the basic design of farm tractors renders them awkward and even dangerous for use in some maintenance operations. For example, the high center of gravity of most farm tractors renders them hard to steer and prone to overturning when used on inclined surfaces.

This invention relates to a vehicle which is designed especially for industrial and municipal maintenance work but which is nevertheless capable of receiving and operating a wide variety of maintenance operation performing accessories. The vehicle is mounted on automobile size tires to provide a low center of gravity and is provided with front wheel drive. Separate power systems are provided for moving the vehicle and for operating accessories supported on the vehicle.

SUMMARY OF THE INVENTION

In the preferred embodiment, this invention comprises a vehicle including a frame having a high portion and a low portion. An engine and a cockpit are supported on the low portion of the frame. Accessories operated by the vehicle are supported under the high portion of the frame. Preferably, the engine drives hydraulic pumps which in turn supply driving power and accessory operating power for the vehicle.

DESCRIPTION OF THE DRAWINGS

A more complete understanding of the invention may be had by referring to the following detailed description when taken in conjunction with the drawings, wherein:

FIG. 6 is a rear perspective view of a portion of the vehicle shown in FIG. 1;

FIG. 7 is a top perspective view of a hydraulic fluid storage tank employed on the vehicle shown in FIG. 1;

FIG. 8 is a side view of a portion of the vehicle shown in FIG. 1;

FIG. 9 is a bottom view of a portion of the vehicle shown in FIG. 1; and

DETAILED DESCRIPTION

Figure 1:
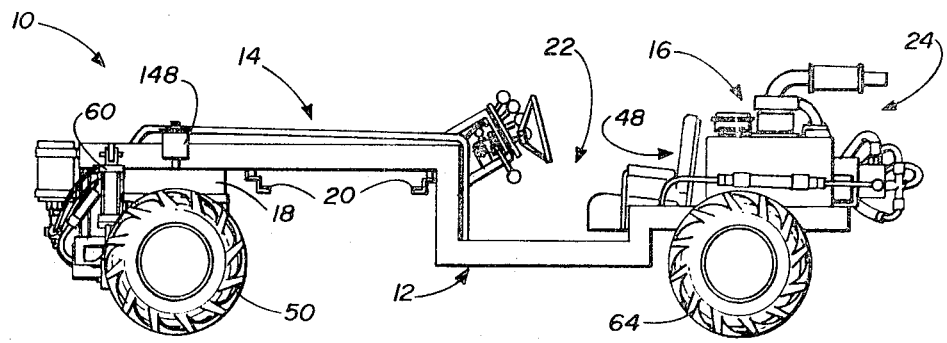
FIG. 1 is a right side view of a maintenance vehicle employing the invention.
Figure 2:
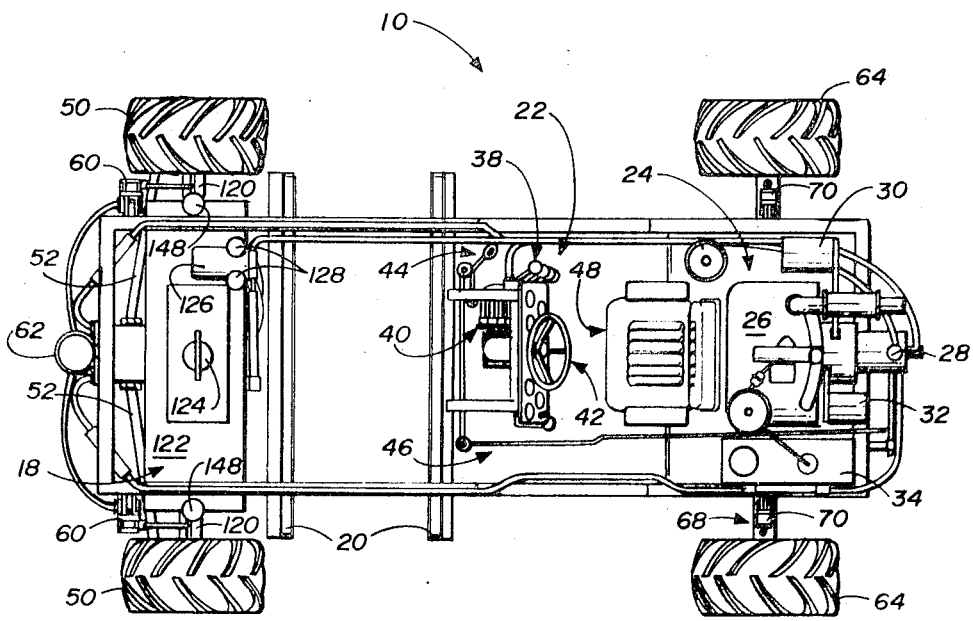
FIG. 2 is a top view of the vehicle shown in FIG. 1.

Referring now to the drawings and particularly to FIGS. 1 and 2 thereof, there is shown a maintenance vehicle 10 employing the invention. The maintenance vehicle 10 includes a frame 12 having a front high portion 14 and a rear low portion 16. The high portion 14 of the frame 12 supports a hydraulic fluid storage tank 18 and a pair of racks 20 which in turn may be used to support any one of a plurality of maintenance accessories, such as a grasscutter, a snow blower, a streetsweeping broom, etc., under the high portion 14 of the frame 12. The low portion 16 of the frame 12 supports a cockpit 22 and an engine and drive assembly 24.

Figure 4:
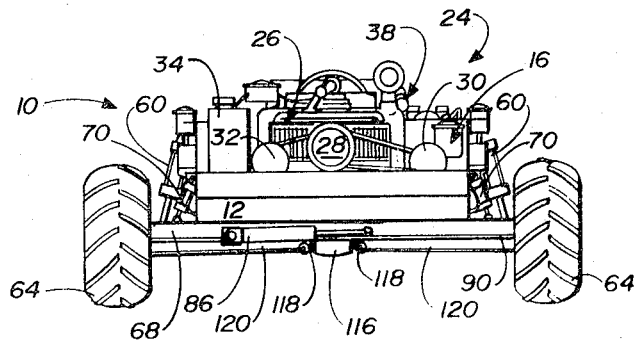
FIG. 4 is a rear view of the vehicle shown in FIG. 1.

As is most clearly shown in the FIGS. 2 and 4, the engine and drive assembly 24 of the maintenance vehicle 10 includes an engine 26, an automatic transmission 28, an accessory pump 30 and a steering pump 32. The engine 26 is a conventional internal combustion, air-cooled engine. Fuel is supplied to the engine 26 from a fuel tank 34 mounted on the lower portion 16 of the frame 12. The engine 26 is of the governed type and, accordingly, once started, the engine 26 operates at a constant speed.

The automatic transmission 28, the accessory pump 30 and the steering pump 32 are all driven by the engine 26. The transmission 28 and the pumps 30 and 32 each receive hydraulic fluid from the tank 18 and supply hydraulic fluid under pressure to various components of the maintenance vehicle 10. The automatic transmission 28 is a variable flow, constant pressure piston pump which includes a supercharger pump. The automatic transmission 28 is operated to supply driving power for the maintenance vehicle 10. The accessory pump 30 is a high-volume pump which is operated to supply power to the cockpit 22 of the vehicle 10. The steering pump 32 is a conventional power steering pump which is operated to supply a steering power for the vehicle 10.

The details of the cockpit 22 are illustrated in FIGS. 1 and 2. The cockpit 22 includes a plurality of four-way valves 38. Hydraulic fluid under pressure is supplied to the valves 38 from the accessory pump 30. Most of the four-way valves 38 in turn extend to a plurality of quick disconnect fittings 40. The fittings 40 may be used to connect the valves 38 to accessories supported on the racks 20 positioned under the high portion 14 of the frame 12. The valves 38 may then be manipulated to control the operation of a maintenance accessory mounted on the vehicle 10. One of the four-way valves 38 extends to the suspension system of the vehicle 10 to control the height of the frame 12 thereof.

In addition to the four-way valve 38, the cockpit 22 includes a steering assembly 42. Hydraulic fluid under pressure is applied to the steering assembly 42 from the steering pump 32. A foot pedal 44 is mounted in the cockpit 22 and is connected to the automatic transmission 28 by a linkage 46. Operation of the pedal 44 adjusts the automatic transmission 28 through the linkage 46 to control the motion of the vehicle 10. Finally, the cockpit 22 includes an operator seat 48. The seat 48 is mounted on the low portion 16 of the frame 12 in such a position that an operator seated in the seat 48 may conveniently reach the valve 38, the steering assembly 42 and the foot pedal 44 of the cockpit 22.

Figure 3:
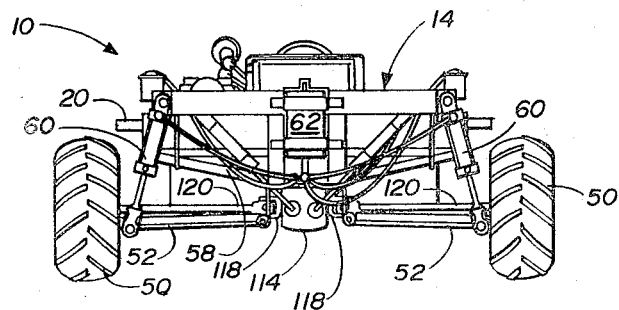
FIG. 3 is a front view of the vehicle shown in FIG. 1.
Figure 5:
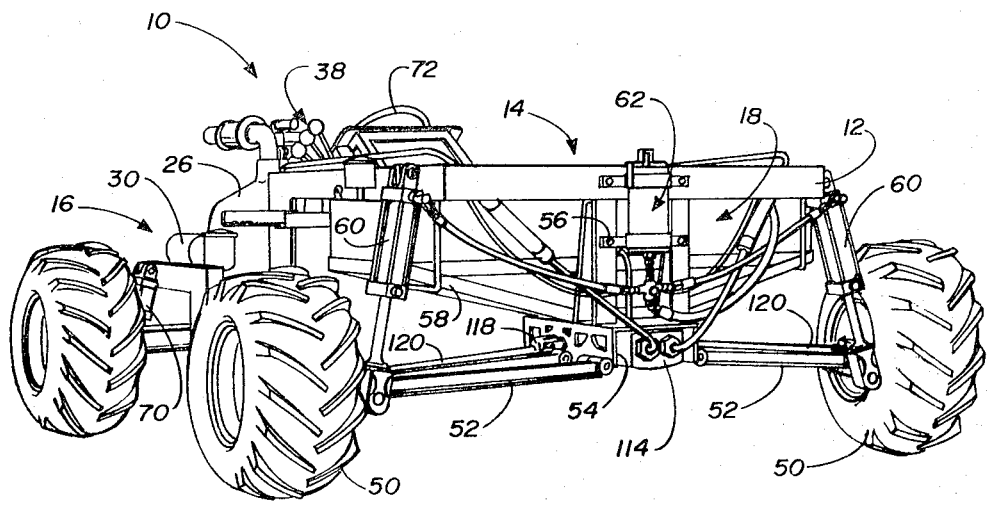
FIG. 5 is a front perspective view of the vehicle shown in FIG. 1.

Referring now to FIGS. 3 and 5, the front suspension of the vehicle 10 is shown. The high portion 14 of the frame 12 is supported on a pair of front wheels 50 which are in turn pivotally supported on a pair of V-shaped arms 52. The arms 52 are pivotally supported on a subframe 54 which is in turn secured to the high portion 14 of the frame 12 by a pair of beams 56 which extend upwardly to the frame 12 and by a plurality of beams 58 which slant outwardly from the subframe 54 to the base of the hydraulic fluid storage tank 18.

The position of the arms 52 with respect to the frame 12 is controlled by a pair of hydraulic pistons 60 which are of the double-acting type. The upper ends of the pistons 60 are connected to a conventional accumulator 62 which is in turn connected to one of the four-way valves 58. The lower ends of the pistons 60 are vented to the atmosphere. The four-way valve 38 that is connected to the accumulator 62 is so arranged that it may be manipulated in one direction to direct hydraulic fluid from the accessory pump 30 to the accumulator 62 and may be manipulated in another direction to direct hydraulic fluid from the accumulator 62 to the tank 18. In this manner, the four-way valve 38 connected to the accumulator 62 may be operated to raise and lower the high portion 14 of the frame 12 with respect to the wheels 50, respectively.

The details of the rear suspension of the vehicle 10 are illustrated in FIGS. 4 and 6. The low portion 16 of the frame 12 of the tractor 10 is supported on a pair of rear wheels 64. The rear wheels 64 are each supported on a spindle 66 which is in turn journaled at one end of an axle 68. The axle 68 is connected to the frame 12 of the vehicle 10 by a pair of hydraulic cylinders 70 similar to the hydraulic cylinders 60. The upper ends of the hydraulic cylinders 70 are connected to the accumulator 62. The lower ends of the cylinder 70 are vented to the atmosphere. Therefore, whenever the four-way valve 38 connected to the accumulator 62 is operated, the low portion 16 of the frame 12 is raised or lowered with respect to the axle 12 by the flow of hydraulic fluid into or out of the cylinders 70.

Because of the positioning of the accumulator 62 between the pistons 60 and 70, the accumulator 62 acts as a spring and shock absorber for the vehicle 10. The cooperation of the accumulator and the pistons provides a very smooth ride for the vehicle 10.

FIGS. 4, 6 and 8 illustrate the steering mechanism of the maintenance vehicle 10. Referring first to FIG. 8, the steering assembly 42 includes a steering wheel 72 which operates a steering valve 74. The steering valve 74 is pivotally supported on a subframe 76 extending from the rear end of the high portion 14 of the frame 12. An arcuate member 78 having a plurality of blind holes 80 extending into it is rigidly secured to the valve 74 for pivotal movement with respect to the subframe 76. A lever 82 having a handle 84 is mounted on the subframe 76 for movement toward and away from the blind holes 80 in the arcuate member 78. The lever 82 is spring loaded for movement towards the arcuate member 78 and has a pin (not shown) adapted to mate with the blind holes 80 mounted on its end remote from the handle 84. Thus, by simply moving the handle 84 away from the valve 74, adjusting the position of the steering wheel 72 with respect to the subframe 76 and releasing the handle 84, the steering wheel 72 may be positioned in any one of a plurality of positions in the cockpit 22.

Hydraulic fluid under pressure is supplied to the steering valve 74 from the steering pump 32. The valve 74 controls the flow of hydraulic fluid from the pump 32 to a hydraulic steering cylinder 86. As is best shown in FIG. 6, the hydraulic cylinder 86 is connected between a bracket 88 extending from the axle 68 and a tie rod 90 extending between a pair of levers 92. The levers 92 are in turn connected to the pivotal supports for the spindles 66 of the rear wheels 64.

The vehicle 10 is steering through the rear wheels 64 by operating the steering wheel 72. Operation of the steering wheel 72 operates the valve 74 to direct hydraulic fluid to the hydraulic cylinder 86. The hydraulic cylinder 86 operates the tie rod 90 which in turn pivots the spindle 66 with respect to the axle 68. The pivoting of the spindles 66 turns the rear wheel 64 to steer the vehicle 10.

FIGS. 5, 6 and 9 illustrate the drive mechanism for the vehicle 10. Referring first to FIG. 6, the pedal 44 includes a pair of actuator plates 92. The plates 92 are mounted on a rod 94 which is in turn fixed to a pivotally supported bracket 96. The bracket 96 is in turn connected to the linkage 46.

The linkage 46 includes a rod 98 which is pivotally connected to the bracket 96 and to a pivotally supported bracket 100. The bracket 100 is connected to a rod 102 which extends to a lever 104. The lever 104 controls the position of a shaft 106 which is pivotally supported and which extends into the housing 108 of the automatic transmission 28.

The linkage 46 connects the pedal 44 to the shaft 106 in such a way that actuation of one of the plates 92 rotates a shaft 106 in one direction while actuation of the other plate 92 rotates the shaft 106 in the opposite direction. The linkage 46, and therefore the shaft 106, is normally centered by a spring 110 which is connected to the rod 102 and to a bracket 112 that is in turn supported on the axle 68.

Whenever the shaft 106 is centered, the automatic transmission 28 produces no output whatsoever. Whenever the shaft 106 is rotated by actuation of either of the plates 92, the automatic transmission 28 directs hydraulic fluid under pressure to a hydraulic motor 114 positioned under the high portion 14 of the frame 12. As is most clearly shown in FIG. 9, the hydraulic motor 114 is connected to a conventional automotive type differential 116 which is in turn connected through a pair of universal joints 118 to a pair of axles 120. As is shown in FIGS. 9 and 5, the axles 120 extend to the front wheel 50. Therefore, whenever either of the plates 92 is actuated, the motor 114 rotates the front wheel of the vehicle 10 to drive the vehicle.

The automatic transmission 28 and the motor 114 are so interconnected that rotation of the shaft 106 a predetermined amount in one direction causes the vehicle 10 to move forward at a predetermined speed. On the other hand, rotation of the shaft 106 the same predetermined amount in the opposite direction causes the vehicle 10 to move backward at the same speed. Therefore, depression of one of the plates 92 causes the vehicle 10 to move forward whereas depression of the other plate 92 the same amount causes the vehicle 10 to move backward at the same speed.

Referring now to FIGS. 2 and 7, the details of the hydraulic fluid storage tank 18 of the vehicle 10 are shown. Referring first to FIG. 2, the tank 18 includes a top plate 122 having a hydraulic fluid supply cap 124 mounted on it. A filter 126 is mounted on the top plate 122. Hydraulic fluid from the various components of the vehicle 10 is returned to the tank 18 through the filter 126. A pair of gauges 128 are positioned on opposite sides of the filter 126. The gauges 128 indicate the difference in the pressure of the hydraulic fluid as it enters and as it leaves the filter 126, respectively. When the differential between the entering and leaving pressures exceeds a predetermined amount, the filter 126 is changed.

Referring now to FIG. 7, the interior of the tank 18 is illustrated. The tank 18 includes four sidewalls 130 and a bottom wall 132. The bottom wall 132 includes a pair of sloping portions which slant inwardly toward a flat center section. A T-shaped baffle 136 including a leg 138 and a top 140 is positioned within the tank 18. A pair of supply fittings 142 extend into the tank 18 on one side of the leg 138 of the baffle 136 and a return fitting 144 extends into the tank 18 on the other side of the leg 138 of the baffle 136. The supply fittings 142 supply hydraulic fluid to the automatic transmission 28 and to the pumps 30 and 32, respectively. The return fitting 144 returns hydraulic fluid to the tank 18 from all the components of the vehicle 10. Because of the relative positioning of the supply fittings 142, the return fitting 144 and the baffle 136, hydraulic fluid returning to the tank 118 is forced to flow around the T-shaped baffle 136 before it enters the supply fittings 142. This allows any air which may have entered the hydraulic fluid to flow out of the fluid. The flow of the fluid around the baffle also allows any turbulence generated by the flow of the fluid into the tank 18 through the fitting 144 to settle out before the fluid enters the fittings 142.

A pair of ventilating assemblies 146 extend across the tank 118 from opposite sides thereof. The assemblies 146 are positioned on the opposite side of the top 140 of the T-shaped baffle 146 from the leg 138. The assemblies 146 each include a filter 148, a check valve 150 and a tube which extends across the tank 18 from the check valve 150. The ventilating assemblies 146 operate to ventilate the interior of the tank 118 regardless of the angular position in which the vehicle may be operated. The check valves 150 prevent hydraulic fluid from flowing out of the assembly 146 positioned on the low side of the vehicle 10.

Figure 10:
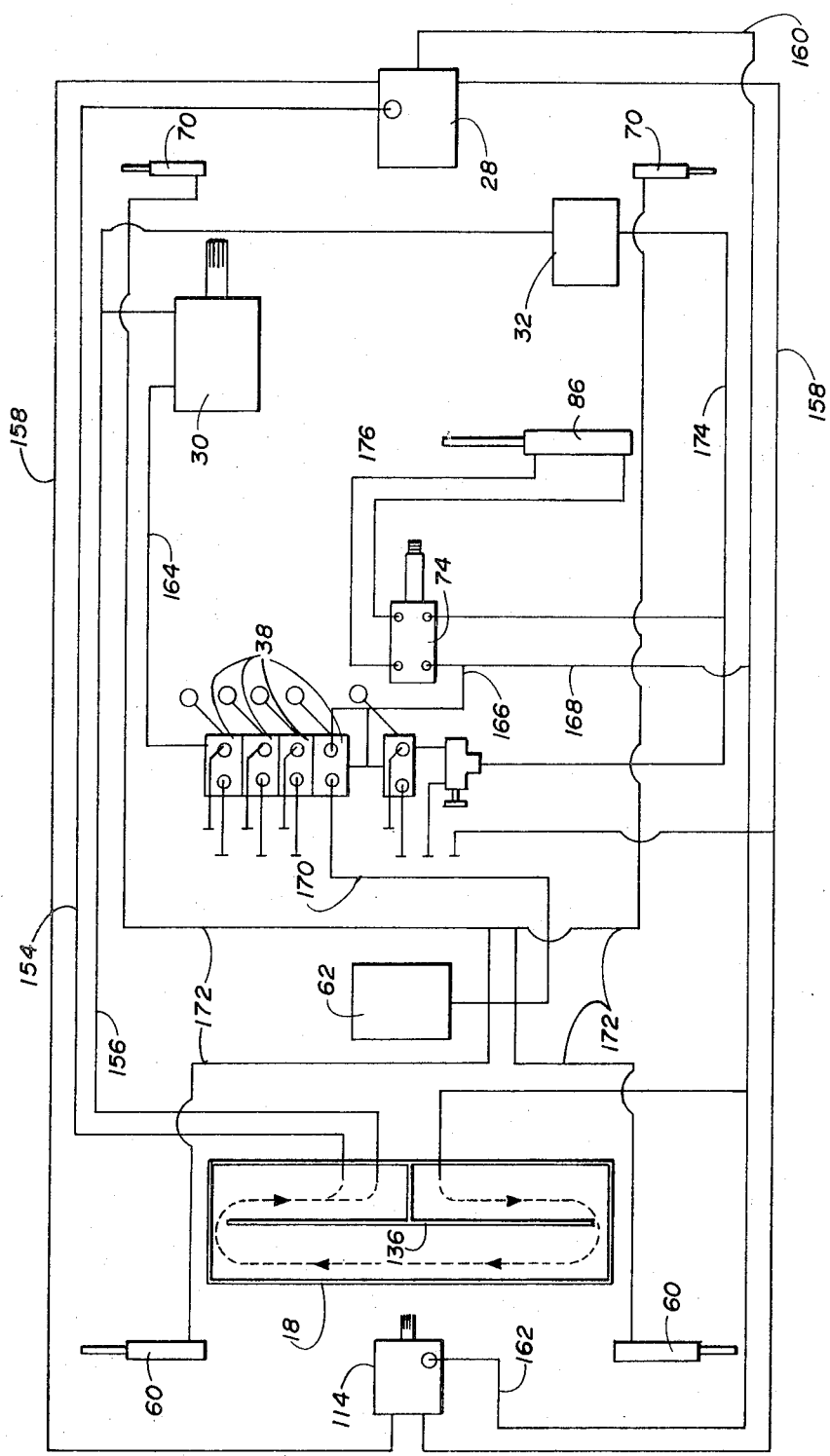
FIG. 10 is a schematic illustration of a hydraulic circuit employed in the vehicle shown in FIG. 1.

Referring now to FIG. 10, the hydraulic circuitry of the vehicle 10 is schematically illustrated. Hydraulic fluid is withdrawn from the hydraulic fluid supply tank 18 through a pair of lines 154 and 156. The line 154 supplies hydraulic fluid to the automatic transmission 28 which in turn supplies hydraulic fluid under pressure to the hydraulic motor 114 through a pair of lines 158. Hydraulic fluid not directed to the motor 114 by the automatic transmission 28 is returned to the tank 18 through a line 160. Hydraulic fluid from the motor 114 is returned to the tank 18 by a line 162 which extends to the line 160.

The line 156 supplies hydraulic fluid to the pumps 30 and 32. The pump 30 directs hydraulic fluid through a line 164 to the four-way valves 38. Any hydraulic fluid not directed by the four-way valves 38 to a maintenance accessory positioned on the racks 20 is directed through a line 166 and a line 168 to the line 160 which returns the fluid to the tank 18. One of the four-way valves 38 is connected through a line 170 to the accumulator 62. The accumulator 62 is in turn connected through a plurality of lines 172 to the hydraulic cylinders 60 and 70.

Hydraulic fluid supplied through the line 156 to the pump 32 is directed under pressure from the pump 32 through the line 174 to the steering valve 74. The valve 74 directs fluid through a pair of lines 176 to the steering cylinder 86. Hydraulic fluid not directed by the valve 74 to the cylinder 86 is returned to the tank 18 through the line 168.

The operation of the maintenance vehicle 10 begins with the mounting of a maintenance accessory on the racks 20 under the high portion 14 of the frame 12. Quick disconnect fittings on the accessory are connected to the quick disconnect fittings 40 on the vehicle 10 and the engine 26 of the vehicle 10 is started. The valve 38 connected to the accumulator 62 is operated to adjust the height of the frame 12 of the vehicle 10. The remaining valves 38 are manipulated to control the operation of hydraulic motors and cylinders on the maintenance accessory.

The operating speed of the engine 26 of the vehicle 10 is adjusted in accordance with the power requirements of the maintenance accessory being operated by the vehicle 10. The actuator plates of the pedal 44 are manipulated to control the movement of the vehicle 10. Since the pedal 44 operates through the linkage 46 on the automatic transmission 28 and not on the engine 26, the speed at which the vehicle 10 moves is entirely independent of the operating speed of the engine 26.

During the operation of the vehicle 10 the accumulator 62 operates as a spring and shock absorber. Whenever the vehicle 10 is turned, steering power is supplied by the pump 32 and is directed to the steering cylinder 86 through the steering valve 74. As long as the accessory mounted on the racks 20 is operated, driving power for the accessory is supplied by the pump 30 through the valves 38.

The hydraulic fluid storage 18 supplies hydraulic fluid to and receives hydraulic fluid from the various components of the vehicle 10. The baffle 136 quells the fluid as it moves through the tank 18. The ventilating assemblies 146 assure proper ventilation of the tank 18 regardless of the positioning of the vehicle 10. The positioning of the tank 18 over the front wheels 50 assures superior traction during the operation of the vehicle 10.

The maintenance vehicle illustrated in the drawings is superior to prior maintenance vehicles in several important respects. First, the racks 20 may be used to support virtually any maintenance accessory under the high portion 14 of the frame 12 of the vehicle 10. Thus, the vehicle 10 is completely flexible in utilization. Second, the suspension of the vehicle 10 results in a very low center of gravity. This permits use of the vehicle 10 on virtually any incline or bank. Third, the front-wheel drive, rear wheel steering of the vehicle 10 results in a maintenance vehicle which is very easy to control while performing maintenance operations. This is very important, especially when performing such maintenance operations as grass cutting. Fourth, the use of the automatic transmission 28 and the pump 30 to supply power to the driving mechanism of the vehicle 10 and the accessory operating valves thereof, respectively, allows the vehicle 10 to be operated at any desired speed, either forward or reverse, while the engine 26 is operated at full speed to provide a high level of operating power for the maintenance performing accessories. Thus, the operating speed of the vehicle and the level of power supplied to a maintenance accessory on the vehicle are completely independent of each other and can be independently regulated in accordance with the maintenance operation being performed. Fifth, the positioning of the operating accessories of the vehicle 10 under the high portion 14 of the frame 12 and the positioning of the cockpit 22 on the low portion 16 of the frame 12 allows the operator of the vehicle to have superior control over the maintenance operation being performed. This is because the operator has both the positioning and the performance of a maintenance accessory mounted on the racks 20 in full view at all times.

Although one embodiment of the invention is illustrated in the drawings and described in the foregoing specification, it will be understood that the invention is not limited to the embodiment disclosed but is capable of rearrangement, modification and substitution of parts and elements without departing from the spirit of the invention.

What is claimed is:

1. A maintenance vehicle comprising:
   a frame having a high portion and a low portion;
   a first pair of wheels for supporting the high portion of the frame;
   a second pair of wheels for supporting the low portion of the frame;
   an engine mounted on the frame at the rear of the low portion of the frame;
   at least two hydraulic pumps mounted on the low portion of the frame for operation by the engine;
   a hydraulic motor mounted on the high portion of the frame;
   differential means connected between the hydraulic motor and the wheels for forming a driving connection therebetween;
   means for hydraulically interconnecting a first of the pumps and the motor;
   a cockpit mounted on the low portion of the frame between the motor and the high portion and including a plurality of valves;
   means for directing the output of a second of the pumps to the valves of the cockpit, and
   means for supporting a maintenance accessory under the high portion of the frame between the first pair of wheels and the low portion of the frame.

2. The maintenance vehicle according to claim 1 wherein the differential means includes a differential mechanism driven by the hydraulic motor,
   a pair of axles each extending from the differential mechanism to one of the wheels, and
   a pair of universal joints each for connecting one of the axles to the differential mechanism.

3. The maintenance vehicle according to claim 2 further including a pair of hydraulic cylinders for controlling the position of the axles relative to the frame,
   a hydraulic accumulator connected between the pair of hydraulic cylinders, and
   means for directing the output of the second of the pumps to the hydraulic cylinder to alter the position of the axles relative to the frame.

4. The maintenance vehicle according to claim 1 further including:
   tie rod means forming a steering connection between the second pair of wheels,
   a hydraulic cylinder for controlling the operation of the tie rod means,
   a rotary steering valve positioned in the cockpit for controlling the operation of the hydraulic cylinder, and means for supplying hydraulic fluid under pressure to the rotary steering valve.

5. The maintenance vehicle according to claim 4 wherein the steering valve is pivotally supported and further including a steering wheel mounted on the steering valve for operating the valve and means for detenting the valve in a plurality of pivotal positions to adjust the position of the steering wheel.

6. The maintenance vehicle according to claim 1 further including a hydraulic fluid storage tank mounted on the high portion of the frame, and
   means for directing hydraulic fluid from the tank to the pumps.

7. The maintenance vehicle according to claim 6 wherein the hydraulic fluid storage tank includes a T-shaped baffle, and
   a pair of breather tubes each extending across the tank from opposite sides thereof and each including a check valve for controlling the flow of hydraulic fluid through the breather tubes.

8. A maintenance vehicle including:
   a frame having a high portion and a low portion;
   a first pair of wheels positioned under the low portion of the frame;
   an engine supported on the low portion of the frame above the first pair of wheels;
   a cockpit supported on the low portion of the frame between the engine and the high portion;
   a second pair of wheels positioned under the high portion of the frame;
   means for supporting a maintenance accessory under the high portion of the frame between the second pair of wheels and the low portion;
   a differential mechanism interconnecting the second pair of wheels;
   a hydraulic motor for driving the differential mechanism, and
   a hydraulic pump driven by the engine by supplying hydraulic fluid to the motor.

9. The maintenance vehicle according to claim 8 wherein the cockpit includes a plurality of hydraulic controls and further including a hydraulic pump driven by the engine for supplying hydraulic fluid to the controls.

10. The maintenance vehicle according to claim 9 further including a hydraulic fluid storage tank supported on the high portion of the frame over the second pair of wheels for supplying hydraulic fluid to the pump.

11. The maintenance vehicle according to claim 8 further including:
    a steering mechanism interconnecting the first pair of wheels;
    a hydraulic cylinder for operating the steering mechanism;
    a hydraulic valve mounted in the cockpit for controlling the operation of the hydraulic cylinder, and
    means for supplying hydraulic fluid to the valve.

12. The maintenance vehicle according to claim 8 further including:
    a pair of hydraulic cylinders positioned between the frame and at least one of the pairs of wheels;
    a hydraulic accumulator connected between the cylinders, and
    means for supplying hydraulic fluid to and withdrawing hydraulic fluid from the accumulator and thereby raising and lowering the frame with respect to the pair of wheels.

13. In a maintenance vehicle a hydraulic fluid storage tank comprising:
    a housing;
    a T-shaped baffle positioned within the housing;
    an inlet port positioned on one side of the leg of the T-shaped baffle;
    an outlet portion positioned on the other side of the leg of the T-shaped baffle;
    a first breather tube extending across the side of the top of the T-shaped baffle opposite the leg from an inlet at one end of the housing to an outlet at the other end of the housing; and
    a second breather tube extending across the side of the top of the T-shaped baffle opposite the leg from an inlet at the other end of the housing to an outlet at the one end thereof.

14. The hydraulic storage tank according to claim 13 wherein each of the breather tubes includes a check valve for controlling the flow of hydraulic fluid through the tube.

* * * * *